United States Patent [19]

Kim et al.

[11] Patent Number: 5,588,717
[45] Date of Patent: Dec. 31, 1996

[54] VALVE UTILIZING SHAPE MEMORY ALLOYS AND AN ANTI-LOCK BRAKE SYSTEM WITH THE VALVE

[75] Inventors: Sang K. Kim; PahngRoc Oh; Hong J. Lee, all of Seoul, Rep. of Korea

[73] Assignee: Daewoo Electronic Co., Ltd., Seoul, Rep. of Korea

[21] Appl. No.: 501,935

[22] Filed: Jul. 13, 1995

[30] Foreign Application Priority Data

Jul. 15, 1994 [KR] Rep. of Korea .................. 94-17255

[51] Int. Cl.$^6$ .................................................. F16K 31/66
[52] U.S. Cl. ............. 303/84.2; 303/119.2; 137/596.17; 137/637.1; 251/11
[58] Field of Search ............... 303/116.1, 116.2, 303/119.1, 119.2, 67, 77, 84.2; 137/596.17, 637.1; 251/11, 68

[56] References Cited

U.S. PATENT DOCUMENTS

| | | | |
|---|---|---|---|
| 4,736,587 | 4/1988 | Suzuki | 251/11 X |
| 5,150,950 | 9/1992 | Arikawa et al. | 303/116.1 X |
| 5,211,371 | 5/1993 | Coffee | 251/11 |

FOREIGN PATENT DOCUMENTS

| | | | |
|---|---|---|---|
| 62987 | 3/1988 | Japan | 251/11 |
| 916853 | 3/1982 | U.S.S.R. | 137/596.17 |

*Primary Examiner*—Josie Ballato
*Attorney, Agent, or Firm*— Oliff & Berridge

[57] ABSTRACT

A valve for performing pressurization, decompression and pressure maintenance includes linear shape memory alloys. An anti-lock brake system utilizes the valve. The valve has plural spools movable up and down within a housing having plural bores. The respective bores have inlets and outlets. A mechanism for holding a lowering state of the spools is installed to the lower portion of the housing, and the spools return to their original positions by bias springs. In the anti-lock brake system, a master cylinder, wheel brakes and a hydraulic pump are connected to the inlets and outlets of the valve, and an electronic control unit is connected to the shape memory alloys to actuate the shape memory alloys, thereby attaining pressurization, decompression and maintenance of brake pressure.

10 Claims, 6 Drawing Sheets

VALVE UTILIZING SHAPE MEMORY ALLOYS AND AN ANTI-LOCK BRAKE SYSTEM WITH THE VALVE

BACKGROUND OF THE INVENTION

1. Field of the Invention

The present invention relates to a valve utilizing shape memory alloys and an anti-lock brake system with the valve, and more particularly to a valve utilizing electrically-controlled shape memory alloys and an anti-lock brake system provided with the valve.

2. Description of the Prior Art

A shape memory alloy denotes an alloy that preserves a shape deformed by an external force below a critical temperature, whereas a shape memory effect of the alloy is activated for recovering a memorized original shape by a shape recovering force after being heated up to the critical temperature. Shape memory alloys such as a titan-nickel alloy and an aluminum alloy are manufactured to have a predetermined shape at a high temperature. Such a shape memory alloy is utilized for valves of various types, and cooperates mechanically or electrically with the valve for moving elements of the valve to a predetermined direction to open/close ports of the valve.

There are methods for applying heat upon the shape memory alloys: one is to permit fluid to flow around the shape memory alloys to vary the temperature of the fluid, and another is to permit current to flow in the shape memory alloys to generate heat by an electrical resistance of the shape memory alloys.

Figure 1:
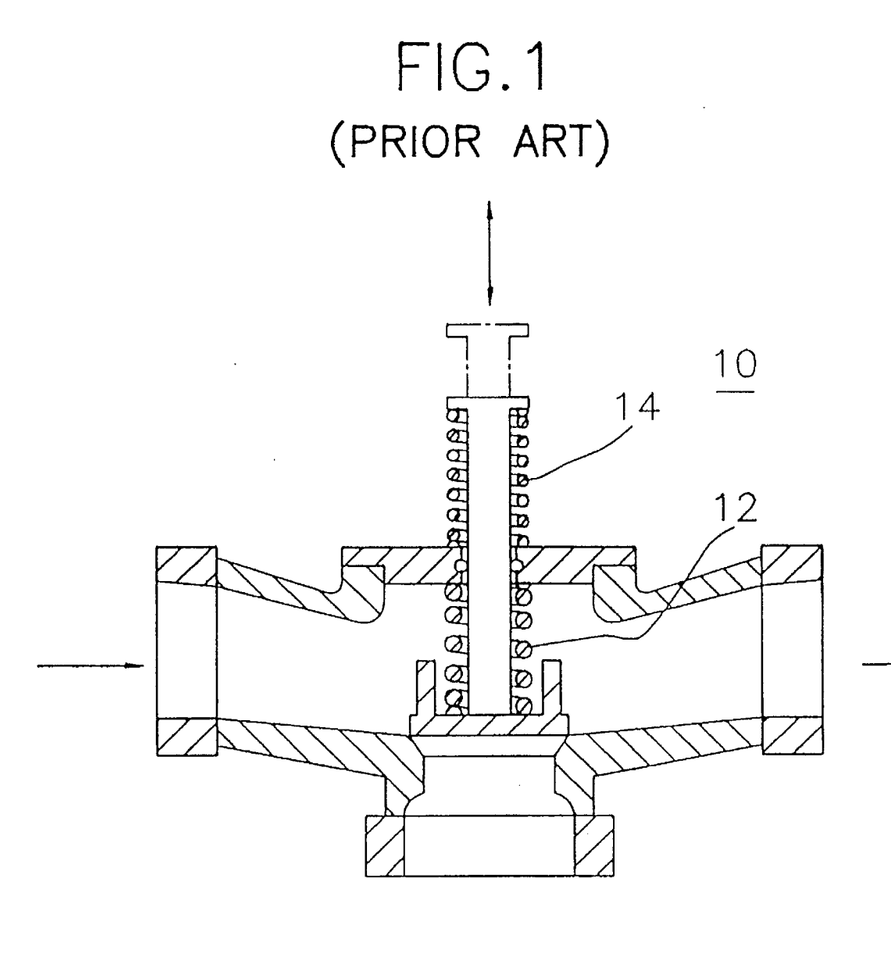
FIG. 1 is a schematic sectional view for showing a conventional valve utilizing shape memory alloy springs.

FIG. 1 illustrates one example of a valve 10 for subjecting the shape memory alloys to heating by varying a temperature of fluid flowing around the shape memory alloys.

In FIG. 1, a spring 12 is in the shape of a coil spring which is manufactured by using a shape memory alloy. The fluid flows around spring 12. Once a temperature of the fluid is raised to reach a critical temperature of the shape memory alloy that initiates the shape memory effect, spring 12 is compressed by the shape recovery force to open valve 10. Meanwhile, when the temperature of the fluid is lowered, spring 12 is relaxed by a bias spring 14 to close valve 10.

However, the conventional valve 10 utilizing the above-described shape memory alloy spring 12 has drawbacks of difficulty in accurately controlling the opening range of valve 10 as well as a slow response speed of spring 12 with respect to the fluid temperature. Additionally, it involves a fastidious manufacturing process since the shape memory alloys must be shaped as the coil.

A valve for improving the above-stated problems is disclosed in U.S. Pat. No. 5,211,371 (issued to Coffee). Shape memory alloys utilized in the valve of Coffee are in the shape of a wire which is electrically-controlled by an electric circuit. The electric circuit is a closed circuit comprising a plurality of transistors and a plurality of capacitors, so that the shape memory alloys are actuated in conformity with a cycle by using operations of charging/discharging the capacitors and switching the transistors.

In the valve of Coffee, however, the valve should be continuously in the open state for maintaining a prescribed pressure. Furthermore, the shape memory alloys should be continuously supplied with current to maintain the open state of the valve. In this case, not only the power is significantly dissipated due to the continuous supply of the current, but also the control of the opening/closing operation of the valve by using the current supply is difficult while the shape memory characteristic is susceptible to be lost.

U.S. Pat. No. 5,092,901 (issued to Hunter et al.) describes shape memory alloy fibers with very short total contraction and relaxation time suitable for being employed as an electro-magnetic actuator. However, Hunter et al. do not specially disclose a valve utilizing the shape memory alloy fibers.

On the other hand, as is widely known, an anti-lock brake system (ABS) indicates a break system for preventing slipping along a road surface of wheels which are locked by the operation of the brake, and for improving a steering property. Especially, the anti-lock brake system affords an effective braking force and a steering capability in case of a sudden stop, braking on a curvy road, a wet road in the rain and an icy ground, and the like.

In the conventional anti-lock system as described above, pressure-regulating valve; of respective wheels are formed of two valves of a diaphragm pattern, i.e., a pressure-holding valve and an exit valve. The pressure-holding valve and exit valve are controlled by two solenoid valves. In a normal braking operation, operation fluid flows to a brake cylinder via the pressure-regulating valves to realize the braking operation. Meantime, if one of the wheels is too abruptly locked, an electronic control unit (ECU) of the anti-lock brake system operates two solenoid valves to control the pressure within the brake cylinder and repeats locking and unlocking of the wheel at a very high speed, so that the slipping of the wheels is prevented while enhancing the steering capability.

However, the solenoid valves utilized for the anti-lock brake system have a complicated structure to require a demanding job in designing and manufacturing process with the consequence of high cost. In connection with the aforesaid valve that utilizes the shape recovery force of the shape memory alloy attributed to the temperature variation of the fluid, the shape memory alloy having a slow response speed with respect to the fluid temperature cannot be employed for the anti-lock brake system which requires a high-speed operation. Moreover, the above valve of Coffee has a difficulty in controlling the opening/closing operation of the valve to be unsuitable for the anti-lock brake system. Further, even though the shape memory alloys of Hunter et al. having short contraction and relaxation time are employed in the anti-lock brake system, the continuous current supply as described above necessarily results in the risks of significant power dissipation and possible loss of shape memory characteristic.

SUMMARY OF THE INVENTION

Accordingly, it is a first object of the present invention to provide a valve utilizing shape memory alloys which are promptly operated, freely and accurately controlled in an open/close operation thereof, and have a simple structure to facilitate the designing and manufacturing thereof.

It is a second object of the present invention to provide an anti-lock brake system with a valve utilizing shape memory alloys capable of being promptly and accurately operated while having a simple structure.

To achieve the first object of the present invention, there is provided a valve including an electronic control unit for generating a first control current and a second control current. Here, the valve also has a housing that includes a first bore with a first inlet for introducing a fluid from a fluid supply and a first outlet for discharging the fluid at an upper portion thereof, and a compartment formed to a lower portion thereof. The first inlet is closed by a first valve spool on a first position of the first valve spool and is open on a second position thereof. A first means applies a biasing force to maintain the first valve spool on the first position of the first valve spool, and a first shape memory alloy member moves the first valve spool to the second position of the first valve spool while overcoming the biasing force of the first means when the first control current is supplied from the electronic control-unit. A second means maintains the first valve spool at the second position when the first valve spool moves to the second position of the first valve spool by the first shape memory alloy member. Furthermore, a third means releases the state of the first valve spool which maintains the second position by the second means when the second control current is supplied from the electronic control unit to permit the first valve spool to move to the first position of the first valve spool by the first means.

According to another embodiment of the present invention the valve further includes a second bore having a second inlet communicated with the first bore and a second outlet for discharging the fluid from the second inlet in the upper portion of the housing. The valve also has a second valve spool for closing the second outlet on a first position and opening the second outlet on a second position thereof. A fourth means is provided for applying a biasing force to maintain the second valve spool at the first position of the second valve spool, and a second shape memory alloy member moves the second valve spool to the second position of the second valve spool while overcoming the biasing force of the fourth means. Here, when the third control current is supplied from the electronic control unit to the second shape memory alloy member, the second valve spool is moved to the second position of the second valve spool by means of the second shape memory alloy member, and maintains its second position by means of the second means when the second control current is supplied from the electronic control unit to the third means, the second valve spool is released from the state that the second valve spool is maintained at the second position of the second valve spool by the third means. Therefore, the second valve spool is moved to the first position of the second valve spool by the fourth means.

Meanwhile, in order to achieve the second object of the present invention, an anti-lock brake system includes a master cylinder for generating a hydraulic pressure to a wheel brake attached to a wheel of a vehicle, a hydraulic regulating unit having a hydraulic pump for regulating the hydraulic pressure of the master cylinder and a hydraulic motor for driving the hydraulic pump. Furthermore, an accumulator is linked to the hydraulic pump for storing brake oil, a wheel-speed sensor is attached to the wheel for sensing a wheel speed to generate a wheel-speed signal, and a vehicle-speed sensor senses a vehicle speed to generate a vehicle-speed signal. An electronic control unit receives the vehicle-speed signal and wheel-speed signal, and calculates a difference between the vehicle-speed signal and wheel-speed signal to generate first control current, second control current and third control current. In addition to these elements, a valve driven by a plurality of shape memory alloy members and performing operations of pressurization, decompression and pressure maintenance is included thereto. The valve includes a housing having a first bore with a first inlet for introducing the brake oil from the master cylinder and a first outlet for discharging the brake oil to the wheel brake in an upper portion thereof, a second bore with a second inlet communicated with the first bore and a second outlet for discharging the brake oil received from the second inlet to the hydraulic pump-in the upper portion thereof, and a compartment formed to a lower portion thereof. The first inlet is closed by a first valve spool on a first position of the first valve spool and opened on a second position of the first valve spool. Also, a second valve spool closes the second outlet on a first position of the second valve spool and opens the second outlet at a second position thereof, a first means for applying a biasing force to maintain the first valve spool at the first position of the first valve spool, and maintain the second valve spool at the first position of the second valve spool. A first shape memory alloy member moves the first valve spool to the second position of the first valve spool while overcoming the biasing force of the first means when the first control current is supplied from the electronic control unit, and a second shape memory alloy member moves the second valve spool to the second position of the second valve spool while overcoming the biasing force of the first means when the second control current is supplied from the electronic control unit. Furthermore, a second means maintains the first valve spool to the second position thereof when the first valve spool is moved to the second position of the first valve spool by means of the first shape memory alloy member, and a third means releases the state that the first and second valve spools are maintained to the second position by the second means when receiving the third control current from the electronic control unit to move the first and second valve spools to the first position of the first and second valve spools by the first means.

According to the valve according to the present invention, the lowered state of the first valve spool which is lowered by the contraction of the first shape memory alloy member is maintained by the second means, so that the valve keeps the ON state. That is, the fluid flows from the first inlet to the first outlet. The first valve spool which maintains the lowered state by the second means is raised by the third and first means to close the first bore, thereby blocking the fluid from flowing to the first outlet. That is, the valve keeps the OFF state.

In the valve utilizing the shape memory alloys according to the present invention, the opening/closing operation of the valve ie controlled by using the Joule's effect by the current flowing in the shape memory alloys, so that the opening/closing operation of the valve is quickly and accurately controllable.

In conjunction with the anti-lock brake system according To the present invention, the first shape memory alloy member is activated by the first control current by stepping on the brake pedal to decelerate and/or stop the vehicle. Thus, the wheel brake is pressurized to decelerate the speed of the wheel. When the second control current is generated, the second shape memory member is activated to close the first inlet and the second outlet is opened to decompress the wheel brake. The pressure of the wheel brake is maintained by generating the third control current, in which the first and second valve spools are raided by the third means to close the first inlet and second outlet. By doing so, the pressurization, decompression and pressure maintenance of the wheel brake is repeated to decelerate the speed of the vehicle.

The anti-lock brake system according to the present invention is simple in its structure, easy to manufacture and low in price.

BRIEF DESCRIPTION OF THE DRAWINGS

The above objects and other advantages of the present invention will become more apparent by describing in detail a preferred embodiment thereof with reference to the attached drawings in which.

DESCRIPTION OF THE PREFERRED EMBODIMENTS

The preferred embodiments of the present invention will be described with reference to the accompanying drawings, in which the same reference numerals represent the same elements.

Embodiment 1

Figure 2:
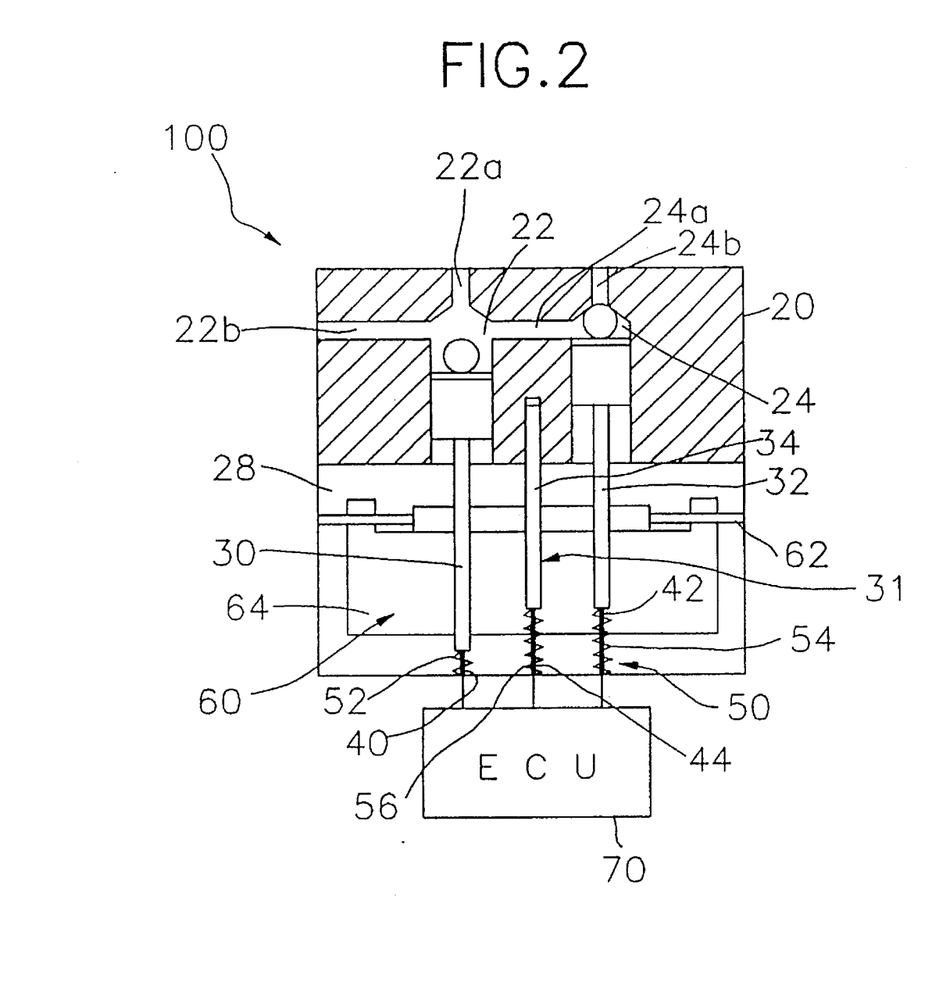
FIG. 2 is a schematic sectional view for showing a valve utilizing shape memory alloys according to one embodiment the present invention.

FIG. 2 is a sectional view for showing a schematic construction of a 3-position 3-way valve 100 according to a first embodiment of the present invention.

As shown in FIG. 2, a first bore 22 having a first inlet 22a communicated to a first outlet 22b, and a second bore 24 having a second inlet 24a communicated to first bore 22 and a second outlet 24b associated with second inlet 24a are formed in the upper portion of a housing 20. A compartment 28 is provided to the lower portion of housing 20.

Figure 3:
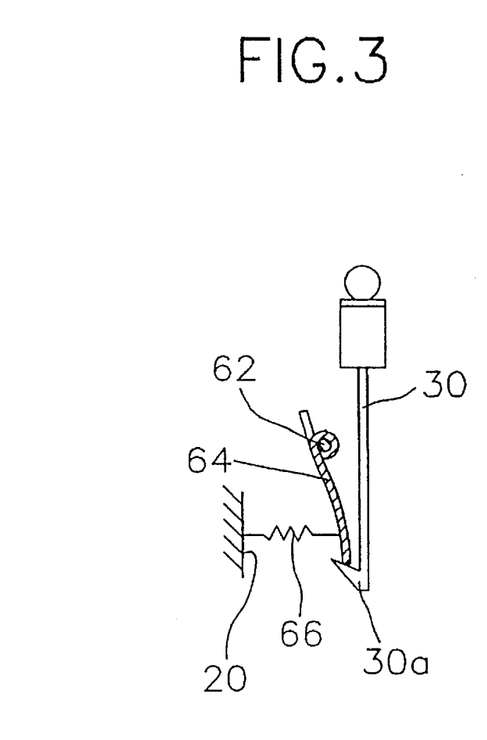
FIG. 3 is a detailed view for showing the state wherein the spool is locked by the plate in FIG. 2.

A first valve spool 30 is movably installed in the up and down direction within first bore 22, and a second valve spool 32 is installed in second bore 24. As shown in FIG. 3, ratchets 30a and 32a of holding unit 60 are formed at the lower ends of first and second valve spools 30 and 32, respectively. First and second valve spools 30 and 32 respectively open and close first and second bores 22 and 24. A release spool 34 is placed onto the inner portion between first and second valve spools 30 and 32.

A first shape memory alloy member 40, a second shape memory alloy member 42 and a third shape memory alloy member 44 are respectively installed between the first and second valve spools 30 and 32, release spool 34 and the bottom surface of housing 20. Preferably, first, second and third shape memory alloy members 40, 42 and 44 are formed to have a linear wire. One end of first shape memory ally member 40 is connected to the lower end of first valve spool 30; one end of second shape memory alloy member 42 is to the lower end of second valve spool 32; and one end of third shape memory alloy member 44 as a release shape memory alloy member is to the lower end of release spool 34. The other ends of first, second and third shape memory alloy members 40, 42 and 44 are fixed to the bottom surface of housing 20 and then electrically connected to an electronic control unit (ECU) 70. First, second and third shape memory alloy members 40, 42 and 44 contract by the control of electronic control unit 70 to allow first and second valve spools 30 and 32 and release spool 34 to be lowered.

Within lower compartment 28 of housing 20, a holding unit 60 is disposed for maintaining a lowered state (the lowered position) of first and second valve spools 30 and 32 when first and second valve spools 30 and 32 are lowered (moves to the lowered position) by first and second shape memory alloy members 40 and 42. Holding unit 60 is further provided with a shaft 62, a plate 64 and a plate spring 66.

FIG. 3 illustrates the locked state of first vale spool by plate 64 shown in FIG. 2.

Shaft 62 is installed within compartment 28 of housing 20 in the transversal direction. Plate 64 is pivotally mounted about shaft 62. One end of plate spring 66 is fixed to the inner side wall of compartment 28 of housing 20, and the other end thereof is fixed to the lower surface portion of plate 64. Plate spring 66 elastically supports plate 64. When first valve spool 30 is lowered by the element, e.g., first shape memory alloy member 40 so that first valve spool 30 is positioned at the lowered position, ratchet 30a of first valve spool 30 is locked to the lower end of plate 64 as shown in FIG. 3 to maintain the lowered state of first valve spool 30.

A bias unit 50 is installed between first and second valve spools 30 and 32, release spool 34 and the bottom surface of housing 20. Bias unit 50 applies a biasing force on first and second valve spools 30 and 32 to maintain first and second valve spools 30 and 32 at a raised position thereof and includes a first bias spring 52 and a second bias spring 54. First bias spring 52 applies a biasing force on first valve spool 30 to maintain its original position when first valve spool 30 under the lowered state is unlocked from plate 64 of holding unit 60; while second bias spring 54 applies an upward biasing force to second valve spool 32 to maintain its original position when second valve spool 32 under the lowered state is unlocked from plate 64 of holding unit 60.

A releasing unit 31 includes a release spool 34, a third shape memory alloy member 44 and a third bias spring 56. Third bias spring 56 forces release spool 34 under the lowered state to move to its original position.

Hereinafter, pressurization, decompression and pressure maintenance operations associated with 3-position 3-way valve 100 shown in FIG. 2 according to the present embodiment of the present invention will be described.

At the state that first inlet 22a is closed by first valve spool 30 and second outlet 24b is closed by second valve spool 32, electronic control unit 70 supplies a first control current to first shape memory alloy member 40. As first shape memory alloy member 40 is heated to contract by the current supplied while overcoming the biasing force of first bias spring 52, first valve spool 30 is lowered to a lowered position. Upon lowering first valve spool 30, plate 64 pivots clockwise about shaft 62 by means of ratchet 30a, and plate spring 66 is compressed. After the end of ratchet 30a of first valve spool 30 passes lower end of plate 64, plate 64 pivots counter-clockwise by plate spring 66. Therefore, as shown in FIG. 3, first valve spool 30 is locked by ratchet 30a and plate 64 while maintaining the lowered state thereof.

At this time, first inlet 22a of housing 20 is opened to effuse an operation fluid to first outlet 22b through a flow passage consisting of first inlet 22a, first bore 22 and first outlet 22b. Therefore, a pressure of the side of the first outlet 22b is increased (pressurization).

In order to lower the pressure of first outlet 22b, electronic control unit 70 supplies a second control current to second shape memory alloy member 42. The contraction of second shape memory alloy member 42 caused by the supplied current overcomes the biasing force of second bias spring 54 so that second valve spool 32 lowers and then, plate 64 pivots clockwise by the lowering of second valve spool 32. First valve spool 30 having been locked to plate 64 is unlocked and second valve spool 32 is locked by plate 64 at the moment ratchet 32a of second valve spool 32 passes the lower end of plate 64. Thus, second valve spool 32 maintains the lowered state by plate 64, and first valve spool 30 is raised by first bias spring 52 to return to the original position.

At this time, first inlet 22a is closed while opening second outlet 24b to thereby form a new flow passage consisting of first outlet 22b, first bore 22, second inlet 24a, second bore 24 and second outlet 24b. As the result, the operation fluid that has been pressurized at first outlet 22b is discharged toward second outlet 24b along the newly-formed flow passage to lessen the pressure of first outlet 22b.

On the other hand, release spool 34 lowers when the current is supplied from electronic control unit 70 to third shape memory alloy member 44 to overcome the upward biasing force of third bias spring 56. Second valve spool 32 having been locked to plate 64 is unlocked (or released) by means of release spool 34. Second valve spool 32 then is raised by means of spring 54 to close second outlet 24b. Release spool 34 is raised to the original position by third bias spring 56.

Thus, both first inlet 22a and second outlet 24b are closed to constantly maintain the pressure of first outlet 22b (pressure maintenance).

The valve according the first embodiment of the present invention as described above performs pressurization, decompression and pressure maintenance operations. The operation of valve 100 does not necessarily proceed in the order from the pressurization, decompression to the pressure maintenance, and the operation order is changed by the control of electronic control unit 70 in accordance with situations. The above-described valve 100 according to the first embodiment of the present invention may be applied to an anti-lock brake system.

Figure 4:
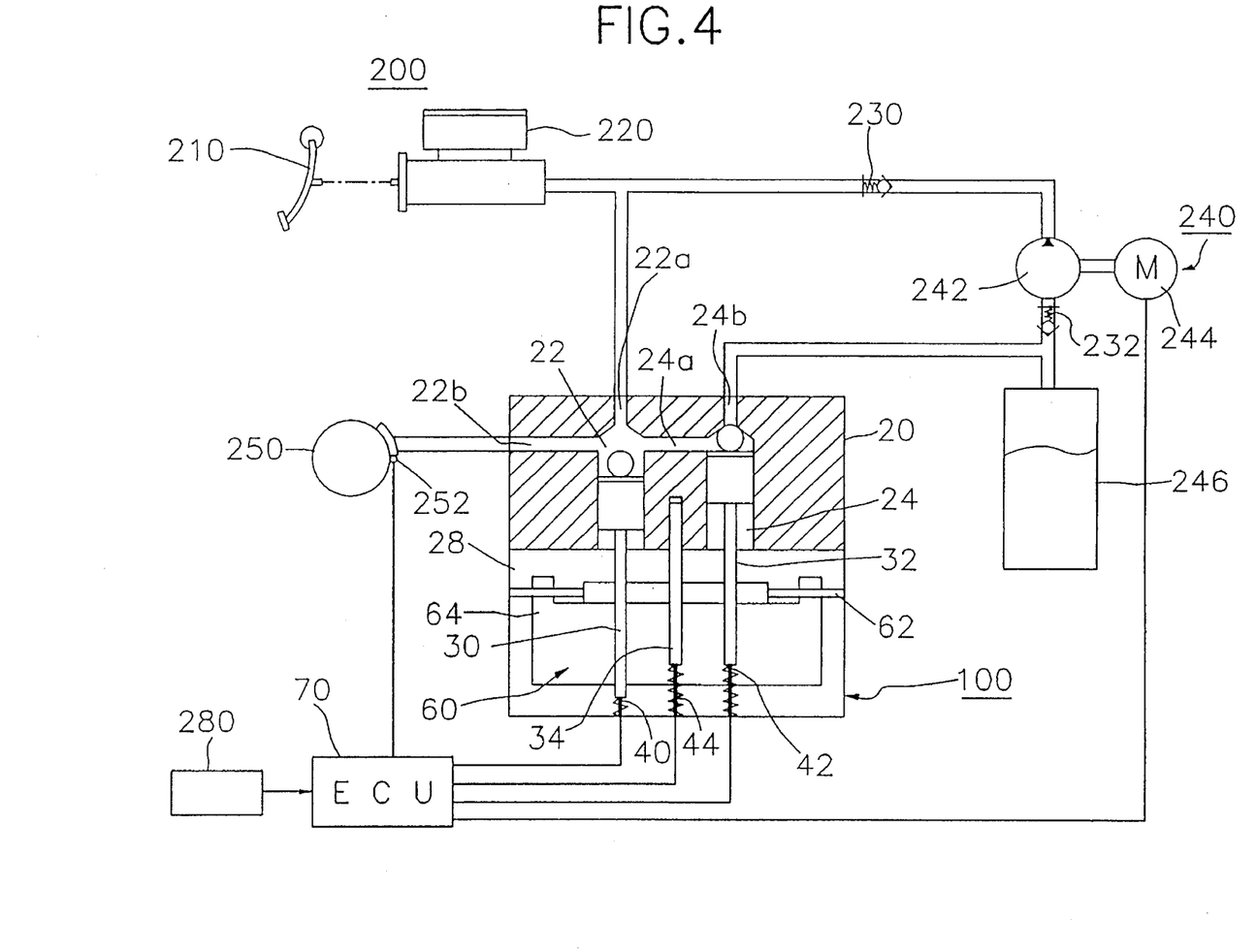
FIG. 4 is a construction view for showing an anti-lock brake system employing the valve of FIG. 2.

FIG. 4 shows a construction of an anti-lock brake system of a vehicle which employs the 3-position 3-way valve shown in FIG. 2 according to the first embodiment of the present invention. To implement the valve utilizing the shape memory alloys to the anti-lock brake system, the total contraction and relaxation time of the shape memory alloy members shall be below 100 milliseconds(ms), preferably within several tens to 100 ms and generates a maximum tension of 5 Kgf. For instance, the shape memory alloy disclosed in the above-mentioned U.S. Pat. No. 5,092,901 may be utilized. In order to satisfy the condition of 100 ms and 5 Kgf of shape memory alloy members, a single shape memory alloy fiber or a bundle of the shape memory alloy fibers which are commercially available, can be utilized to form the shape memory alloy members.

One side of a master cylinder 220 is linked to a brake pedal 210. By a driver's stepping on brake pedal 210, master cylinder 220 provides a hydraulic pressure to a wheel brake 254 attached to a wheel 250 of the vehicle.

A hydraulic regulator 240 has a hydraulic pump 242 for regulating the hydraulic pressure of master cylinder 220 and a hydraulic motor 244 for driving hydraulic pump 242. Hydraulic pump 242 of hydraulic regulator 240 is connected to master cylinder 220 via a first check valve 230. Hydraulic motor 244 regulates the hydraulic pressure to be constant and is automatically stopped when the pressure exceeds a predetermined value.

An accumulator 246 for storing brake oil is connected to hydraulic pump 242 of hydraulic regulator 240 via a second check valve 232.

3-position 3-way valve 100 according to the first embodiment of the present invention is used as an actuator in this embodiment. First inlet 22a of valve 100 is joined between master cylinder 220 and first check valve 230. Second outlet 24b is joined between second check valve 232 and accumulator 246. First outlet 22b is connected to wheel brake 254.

A wheel-speed sensor 252 is attached to wheel 250 to sense the speed of wheel 250, thereby generating a wheel-speed signal.

A vehicle-speed sensor 280 senses the speed of the vehicle to generate a vehicle-speed signal.

Figure 6:
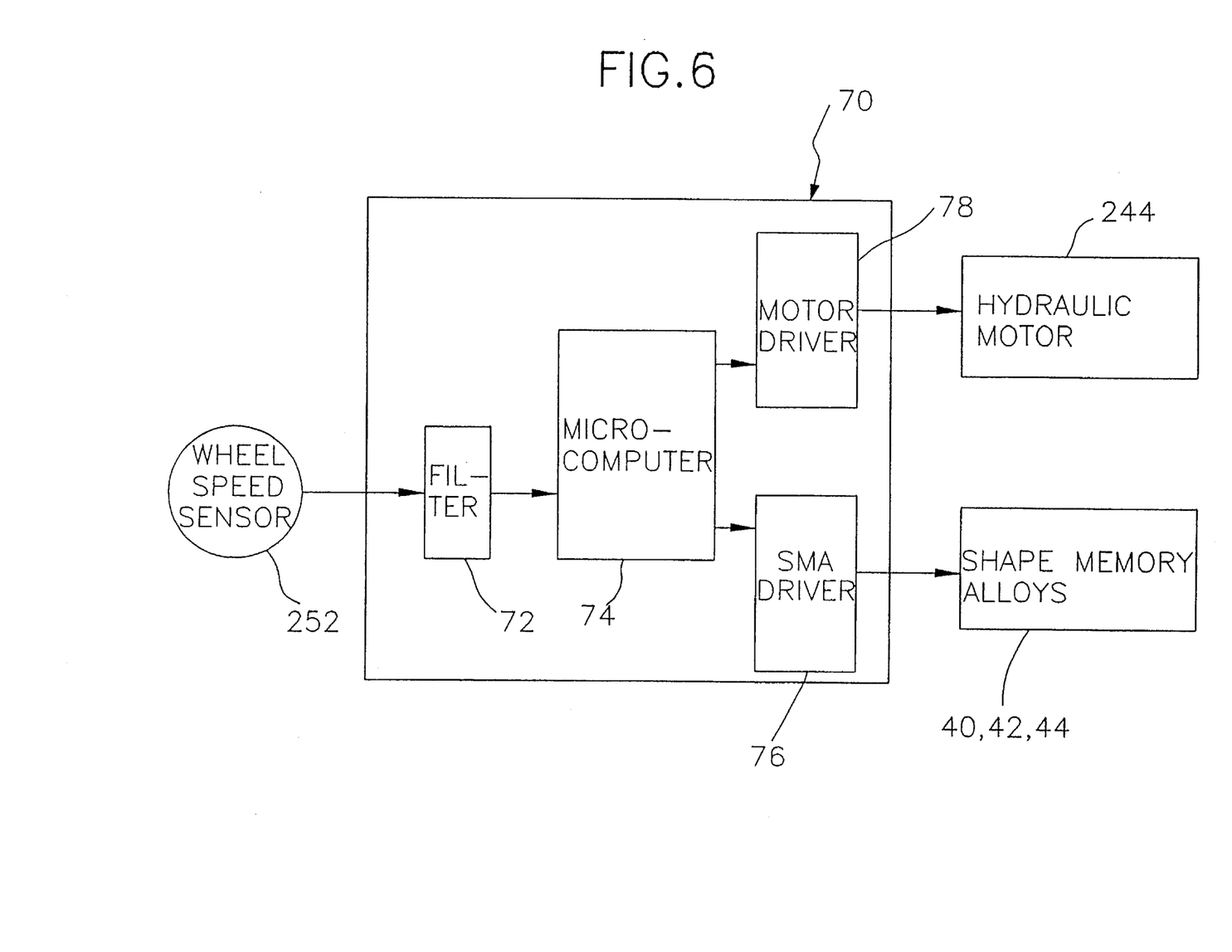
FIG. 6 is a block diagram for showing the electronic control unit applied to the anti-lock brake system shown in FIG. 4.

Electronic control unit 70 for controlling valve 100 and hydraulic regulator 240, as illustrated in FIG. 6, includes a filter 72, a microcomputer 74, a shape memory alloy driver 76 for actuating first, second and third shape memory alloy members 40, 42 and 44 and a motor driver 78 for driving hydraulic motor 244. Electronic control unit 70 is electrically-connected to wheel-speed sensor 252, vehicle-speed sensor 280, valve 100 and motor 244.

Filter 72 receives the wheel-speed signal from wheel-speed sensor 252 to filter the wheel-speed signal from wheel-speed sensor 252, and the filtered signals are then transmitted to microcomputer 74.

Microcomputer 74 calculates a difference between the received vehicle-speed signal and wheel-speed signal, and, in view of the difference, generates a current control signal that controls intensity of the current supplied to first, second and third shape memory alloy members 40, 42 and 44 and a timing signal that controls time taken for supplying the current to first, second and third shape memory alloy members 40, 42 and 44. In addition, an hydraulic-pressure control signal is generated for controlling hydraulic motor 244 which drives hydraulic pump 242.

The current control signal comprises a first current control signal for controlling the intensity of the current supplied to first shape memory alloy member 40, a second current control signal for controlling the intensity of the current supplied to second shape memory alloy member 42, and a third current control signal for controlling the intensity of the current supplied to third shape memory alloy member 44. The timing signal comprises a first timing signal that controls the time for supplying the current to first shape memory alloy member 40, e second timing signal that controls the time for supplying the current to second shape memory alloy member 42 and a third timing signal that controls the time for supplying the current to third shape memory alloy member 44. The current control signal and timing signal are transmitted to shape memory alloy driver 76.

Figure 7:
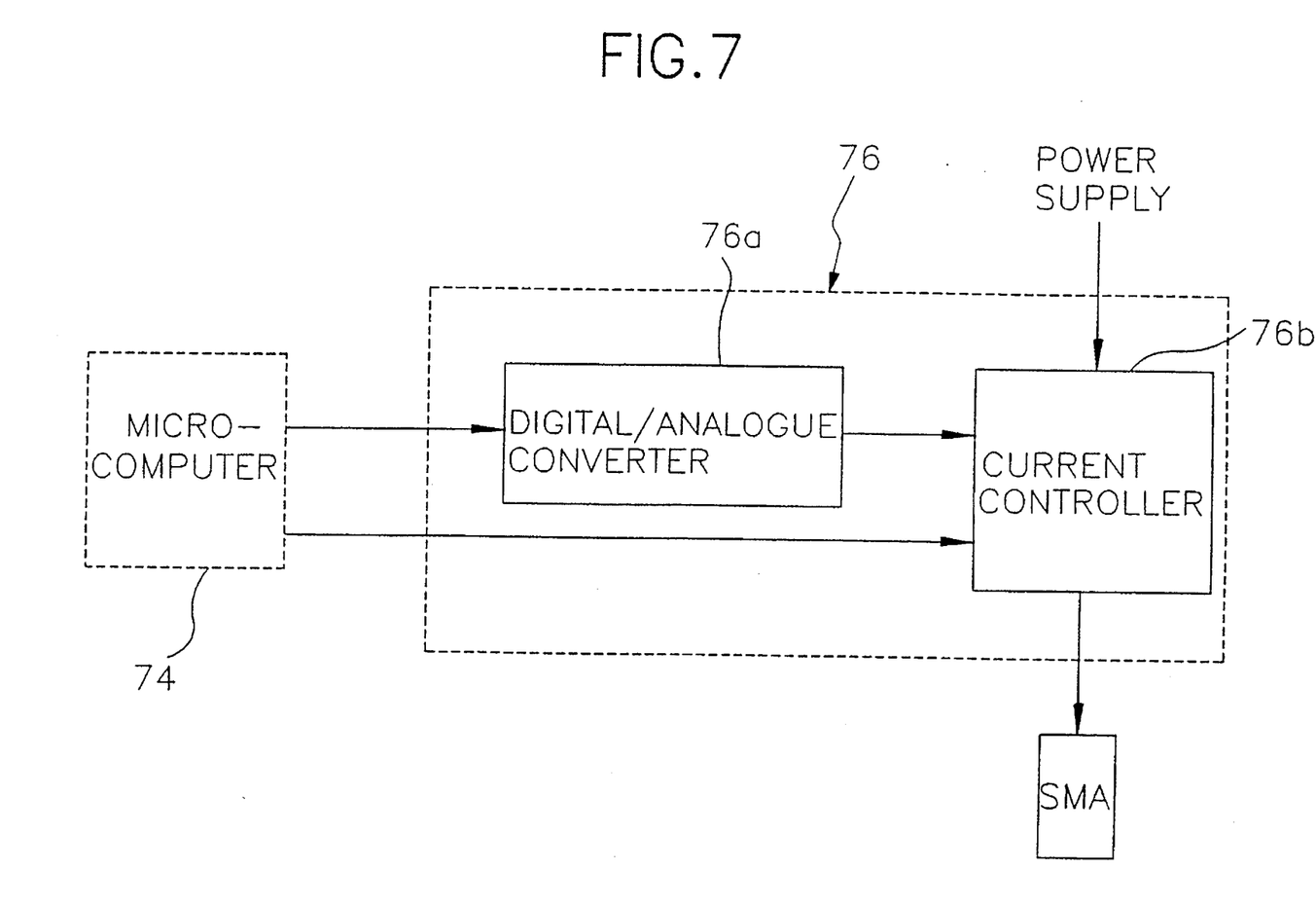
FIG. 7 is a block diagram for showing the shape memory alloy driver employed to the electronic control unit of FIG. 6.

As illustrated in FIG. 7, shape memory alloy driver 76 has a digital/analog converter (hereinafter referred to D/A converter) 76a and a current controller 76b.

D/A converter 76a receives the first, second and third control signals from microcomputer 74 to convert the received signals to analog signals.

Current controller 76b receives the first, second and third timing signals from microcomputer 74, receives the first, second and third current control signals from D/A converter 76a and is supplied with power from a power supply (not shown), thereby supplying the current of a predetermined intensity to first, second and third shape memory alloy members 40, 42 and 44 for a predetermined time.

Motor driver 78 activates hydraulic motor 244 in accordance with the hydraulic-pressure control signal from microcomputer 74. When the pressure within the anti-lock brake system declines below the predetermined pressure, hydraulic motor 244 is driven again by motor driver 78.

The operation of the above-stated anti-lock brake system which employs valve 100 utilizing the shape memory alloys according to the first embodiment of the present invention will be described below.

When the driver steps on brake pedal 210 to decelerate and/or stop the vehicle, the hydraulic pressure is generated in master cylinder 220. At this time, microcomputer 74 of electronic control unit 70 receives the wheel-speed signal from wheel-speed sensor 252 and the vehicle-speed signal from vehicle-speed sensor 280 to compare the vehicle speed with wheel speed and obtain a difference between them. Then, in view of the difference, the first current control signal and first timing signal are generated. Shape memory alloy driver 76, in turn, supplies the current to first shape memory alloy member 40 in accordance with the first current control signal and first timing signal.

At this time, first shape memory alloy member 40 contracts to lower first valve spool 30 which is then locked to plate 64, so that first inlet 22a of first bore 22 is open. As the result, the brake oil flows to first outlet 22b through first inlet 22a and first bore 22 of valve 100 to increase the pressure of wheel brake 254 (pressurization). Hence, wheel brake 254 is operated to decrease the speed of wheel 250 (deceleration).

If wheel 250 becomes locked, i.e., if the difference between vehicle speed and wheel speed becomes the same as the vehicle speed, this situation adversely affects a braking distance and steering capability. Thus, the pressure of wheel brake 254 is required to be lowered so as not to lock wheel 250.

When the difference between the vehicle speed and wheel speed is smaller than a predetermined value, microcomputer 74 generates the second current control signal and second timing signal. In response to these signals, second valve spool 32 lowers, and first valve spool 30 is unlocked from plate 64. First valve spool 30 then is raised by first bias spring 50 to close first inlet 22a and open second outlet 24b.

As the result, the brake oil pressurizing wheel brake 254 flows to accumulator 246 via first outlet 22b, second inlet 24a, second bore 24 and second outlet 24b to decrease the pressure of wheel brake 254 (decompression). Accordingly, the speed of wheel 250 is increased again (acceleration).

If the wheel speed approaches the vehicle speed, i.e., if the difference between the vehicle speed and wheel speed is small, it is required to decelerate the vehicle. At this time, the pressure of wheel brake 254 is increased in the order of the deceleration process.

When the difference between the vehicle speed and wheel speed reaches the predetermined value, the pressure of wheel brake 254 needs to be maintained. For this purpose, microcomputer 74 produces the third current signal and third Liming signal. Thereafter, current controller 76b receives the third current control signal and third timing signal to supply the current to third shape memory alloy member 44 which, in turn, contracts to lower release spool 34, so that both first and second valve spools 30 and 32 are raised and first inlet 22a and second outlet 24b are closed. Thus, the pressure of wheel brake 254 is constantly maintained (pressure maintenance).

By the above-described operations, the pressurization, decompression and pressure maintaining of wheel brake 254 are repeatedly executed to decelerate the speed of the vehicle.

Embodiment 2

Figure 5:
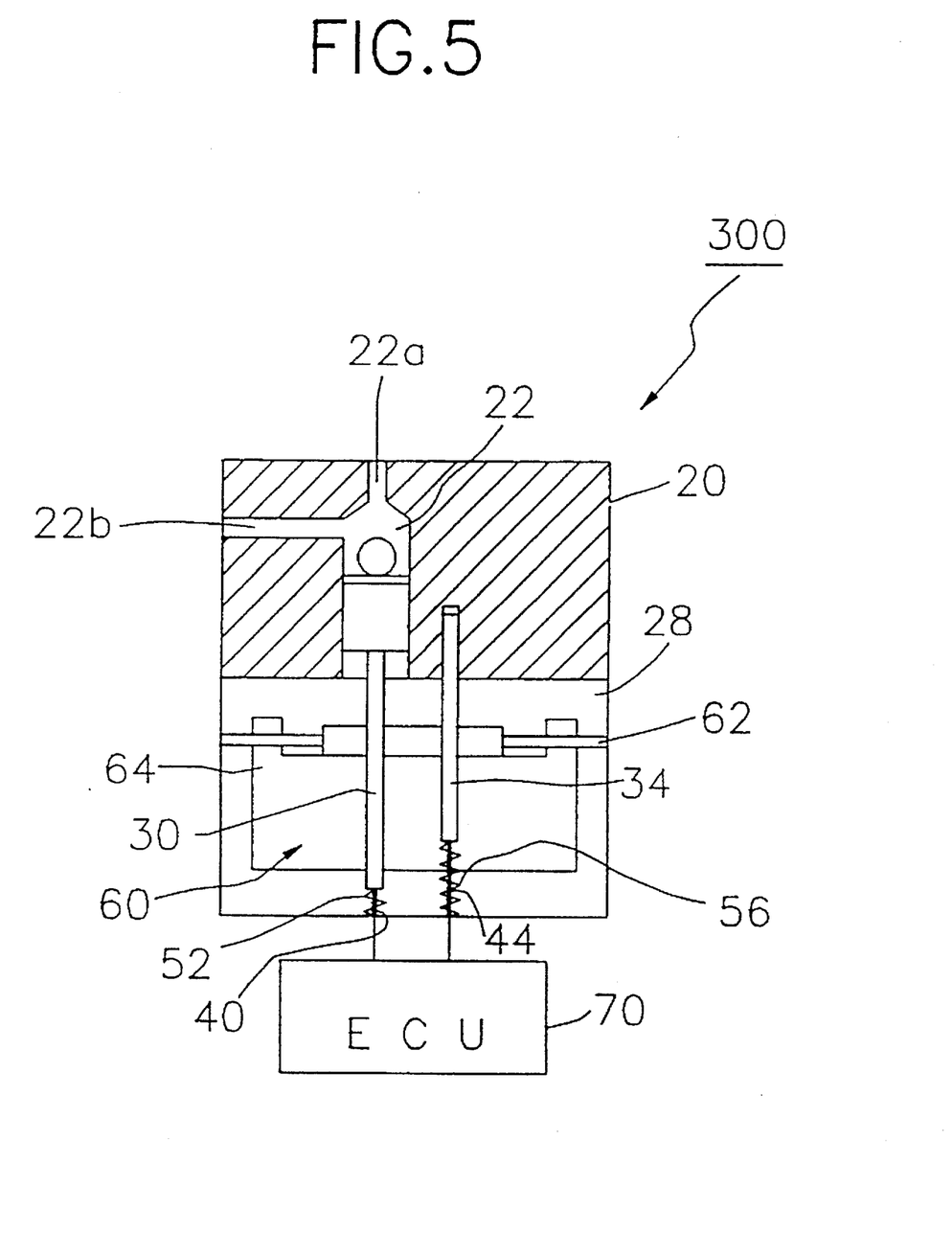
FIG. 5 is a schematic sectional view for showing the valve utilizing shape memory alloys according to a second embodiment of the present invention.

FIG. 5 is a sectional view for showing a schematic construction of a 2-position 2-way valve 300 according to a second embodiment of the present invention. As compared with 3-position 3-way valve 100 shown in FIG. 2, 2-position 2-way valve 300 has the same construction as valve 100 of FIG. 2 excepting the lack of second bore 24 having second inlet 24a and second outlet 24b, second valve spool 32, second shape memory alloy member 42 and second bias spring 52.

The operation of valve 300 according to the second embodiment of the present invention will be described.

Firstly, electronic control unit 70 supplies the current to first shape memory alloy member 40. Due to the supplied current, first valve spool 30 is lowered to be locked to plate 64. Therefore, first inlet 22a is open to allow the fluid to flow along first inlet 22a, first bore 22 and first outlet 22b (ON).

In order to block the fluid flowing to first outlet 22b, electronic control unit 70 supplies the current to third shape memory alloy member 44. Due to the supplied current, release spool 34 is lowered to unlock first valve spool 30 from plate 64. Unlocked first valve spool 30 is raised by first bias spring 52. Finally, first inlet 22a is closed to block the flow of the fluid to first outlet 22b (OFF).

As described above, 2-position 2-way valve 300 according to the second embodiment of the present invention is mainly used as an ON/OFF valve for managing the flow of the fluid. When employing two valves 300, however, the same operation and effect as of 3-position 3-way valve 100 according to the first embodiment of the present invention can be exerted.

In a valve utilizing shape memory alloys according to the present invention as described above, a Joule's effect by current passing through the shape memory alloys is utilized for controlling the opening/closing of the valve to enable a prompt and accurate control of the opening/closing operation of the valve, Also, the open state can be continuously maintained by a holding unit without continuously supplying the current to the shape memory alloys, which not only prevents the loss of the shape memory characteristic of shape memory alloys but also economizes the electric power consumption while more accurately carrying out the opening/closing operation of the valve.

In addition to these, the valve utilizing the shape memory alloy wire according to the present invention is simple in its structure to facilitate the design and manufacturing thereof, thereby reducing manufacturing cost.

Furthermore, by utilizing the electrically-controlled shape memory alloys, there is provided an anti-lock brake system simple in its structure, easy to be manufactured and low in price. In the anti-lock brake system according to the present invention, the opening/closing operation of the valve can be accurately performed even without continuously supplying the current to the shape memory alloys to slightly consume the electric power and secure reliability during the operation thereof.

While the present invention has been particularly shown and described with reference to particular embodiment thereof, it will be understood by those skilled in the art that various changes in form and details may be effected therein without departing from the spirit and scope of the invention as defined by the appended claims.

What is claimed is:

1. A valve comprising:

an electronic control unit for generating a first control current and a second control current;

a housing including a bore formed in an upper portion thereof having an inlet for introducing a fluid from a fluid supply and an outlet for discharging the fluid, and a compartment formed in a lower portion thereof;

a valve spool for closing the inlet at a first position of said valve spool and for opening the inlet at a second position of said valve spool;

biasing means for applying a biasing force to said valve spool to maintain said valve spool at the first position of said valve spool;

a shape memory alloy member for moving said valve spool to the second position of said valve spool while overcoming the biasing force of said biasing means when the first control current is supplied from said electronic control unit;

holding means for maintaining said valve spool at the second position of said valve spool when said valve spool moves to the second position of said valve spool by said shape memory alloy member; and releasing means for releasing a state of said valve spool which is maintained at the second position of said valve spool by means of said holding means when the second control current is supplied from said electronic control unit, so that said valve spool is moved to the first position of said valve spool by said biasing means, wherein said biasing means is a spring installed between a bottom surface of said compartment and a lower end of said valve spool, said shape memory alloy member is installed between said valve spool and the bottom surface of said compartment is electrically connected to said electronic control unit, and has a shape of a linear wire, and said holding means comprises:
a shaft transversely-installed within said compartment;
a plate pivotally mounted about said shaft;
a plate spring installed between an inner sidewall of said compartment and a lower surface of said plate for elastically supporting said plate; and
a ratchet formed at a lower end of said valve spool for being locked to said plate when said valve spool is positioned at the second position of said valve spool.

2. A valve according to claim 1, wherein said releasing means comprises:
a release spool installed within said housing, to move upwards and downwards;
a release bias spring installed between said release spool and the bottom surface of said compartment for applying an upward biasing force to said release spool; and
a release shape memory alloy member for lowering said release spool while overcoming the upward biasing force of said release bias spring when the second control current is supplied from said electronic control unit,
whereby said release spool pivots said plate while being lowered so that said valve spool is moved to the first position of said valve spool by said biasing means.

3. A valve comprising:
an electronic control unit for generating a first control current, a second control current and a third control current;
a housing including a first bore and a second bore formed in an upper portion thereof and a compartment in a lower portion thereof, the first bore having a first inlet for introducing a fluid from a fluid supply and a first outlet for discharging the fluid, the second bore having a second inlet communicated with the first bore and a second outlet for discharging the fluid introduced from the second inlet;
a first valve spool for closing the first inlet at a first position of said first valve spool and for opening the first inlet at a second position of said first valve spool;
a second valve spool for closing the second outlet at a first position of said second valve spool and for opening the second outlet at a second position of said second valve spool;

first biasing means for applying a biasing force to said first valve spool to maintain said first valve spool at the first position of said first valve spool;

second biasing means for applying a biasing force to said second valve spool to maintain said second valve spool at the first position of said second valve spool;

a first shape memory alloy member for moving said first valve spool to the second position of said first valve spool while overcoming the biasing force of said first biasing means when the first control current is supplied from said electronic control unit;

a second shape memory alloy member for moving said second valve spool to the second position of said second valve spool while overcoming the biasing force of said second biasing means when the third control current is supplied from said electronic control unit;

holding means for maintaining said first valve spool at the second position of said first valve spool when said first valve spool moves to the second position of said first valve spool by said first shape memory alloy member and maintaining said second valve spool at the second position of said second valve spool when said second valve spool moves to the second position of said second valve spool by said second shape memory alloy member; and releasing means for releasing a state of said first valve spool which is maintained at the second position of said first valve spool by means of said holding means and releasing a state of said second valve spool which is maintained at the second position of said second valve spool by means of said holding means when the second control current is supplied from said electronic control unit, so that said first valve spool is moved to the first position of said first valve spool by said first biasing means, and said second valve spool is moved to the first position of said second valve spool by said second biasing means, wherein said first and said second biasing means are first and second springs respectively installed between a bottom surface of said compartment and a lower end of said first valve spool and between the bottom surface thereof and a lower end of said second valve spool, said first and said second shape memory alloy members are respectively installed between said first valve spool and the bottom surface of said compartment and between said second valve spool and the bottom surface of said compartment, and said first and second shape memory alloy members each are electrically connected to said electronic control unit and have a shape of a linear wire, and said holding means comprises:
a shaft transversely-installed within said compartment;
a plate pivotally mounted about said shaft;
a plate spring installed between an inner sidewall of said compartment and a lower surface of said plate for elastically supporting said plate; and
first and second ratchets formed at the respective lower ends of said first and second valve spools for being locked to said plate when said first and said second valve spools are positioned at the respective second position thereof.

4. A valve according to claim 3, wherein said releasing means comprises:
a release spool installed within said housing, to move upwards and downwards;

a release bias spring installed between said release spool and the bottom surface of said compartment for applying an upward biasing force to said release spool; and a release shape memory alloy member for lowering said release spool while overcoming the upward biasing force of said release bias spring when the second control current is supplied from said electronic control unit, whereby said release spool pivots said plate while being lowered so that said first valve spool is moved to the first position of said first valve spool by said first biasing means, and so that said second valve spool is moved to the first position of said second valve spool by said second biasing means.

5. A valve comprising:

an electronic control unit for generating a first control current, a second control current and a third control current;

a housing having a first bore and a second bore in an upper portion thereof and a compartment in a lower portion thereof, the first bore having a first inlet for introducing fluid from a fluid supply and a first outlet for discharging the fluid, the second bore having a second inlet communicated with the first bore and a second outlet for discharging the fluid which has been introduced through the second inlet;

a first valve spool and a second valve spool respectively having first and second ratchets formed to respective lower ends, said first valve spool closing the first inlet at a first position of said first valve spool and opening the first inlet at a second position of said first valve spool, said second valve spool closing the second outlet at a first position of said second valve spool and opening the second outlet at a second position thereof;

a first spring installed between a bottom surface of said compartment and a lower end of said first valve spool for applying a biasing force to maintain said first valve spool at the first position of said first valve spool, and a second spring installed between the bottom surface of said compartment and a lower end of said second valve spool for applying a biasing force to maintain said second valve spool at the first position of said second valve spool;

a first shape memory alloy wire installed between said first valve spool and the bottom surface of said compartment and electrically-connected to said electronic control unit for moving said first valve spool to the second position of said first valve spool while overcoming the biasing force of said first spring when the first control current is supplied from said electronic control unit;

a second shape memory alloy wire installed between said second valve spool and the bottom surface of said compartment and electrically-connected to said electronic control unit for moving said second valve spool to the second position of said second valve spool while overcoming the biasing force of said second spring when the second control current is supplied from said electronic control unit;

a holding unit having a shaft transversely-installed within said compartment, a plate pivotally-mounted about said shaft and a plate spring installed between an inner sidewall of said compartment and a lower surface of said plate for elastically supporting said plate, said first and second ratchets being locked to said plate when said first and second valve spools are positioned at respective second positions; and a release part including a release spool which is upwards and downwards movably installed within said housing, a release bias spring installed between said release spool and the bottom surface of said compartment for applying an upward biasing force to said release spool, and a release shape memory alloy wire for lowering said release spool while overcoming the upward biasing force of said release bias spring when the third control current is supplied from said electronic control unit, whereby said release spool pivots said plate while being lowered for moving said first valve spool to the first position of said first valve spool by means of said first spring, and moving said second valve spool to the first position of said second valve spool by means of said second spring.

6. An anti-lock brake system comprising:

a master cylinder for generating a hydraulic pressure to a wheel brake attached to a wheel of a vehicle;

a hydraulic regulator having a hydraulic pump for regulating the hydraulic pressure of said master cylinder, and a hydraulic motor for driving said hydraulic pump;

an accumulator linked to said hydraulic pump for storing brake oil;

a wheel-speed sensor attached to said wheel for sensing a wheel speed to generate a wheel-speed signal;

a vehicle speed sensor for sensing a vehicle speed to generate a vehicle-speed signal;

an electronic control unit for receiving the vehicle-speed signal and the wheel-speed signal, and calculating a difference between the vehicle-speed signal and the wheel-speed signal to generate a first control current, a second control current, and a third control current; and a valve including a housing having a first bore and a second bore in an upper portion thereof and a compartment in a lower portion thereof, the first bore with a first inlet for introducing the brake oil from said master cylinder and a first outlet for discharging the brake oil to said wheel brake, the second bore with a second inlet communicated with the first bore and a second outlet for discharging the brake oil received from the second inlet to said hydraulic pump, a first valve spool for closing the first inlet at a first position of said first valve spool and for opening the first inlet at a second position of said first valve spool, a second valve spool for closing the second outlet at a first position of said second valve spool and for opening the second outlet at a second position of said second valve spool, biasing means for applying a biasing force to maintain said first valve spool at the first position of said first valve spool, and to maintain said second valve spool at the first position of said second valve spool, a first shape memory alloy member for moving said first valve spool to the second position of said first valve spool while overcoming the biasing force of said biasing means when the first control current is supplied from said electronic control unit, a second shape memory alloy member for moving said second valve spool to the second position of said second first valve spool while overcoming the biasing force of said biasing means when the second control current is supplied from said electronic control unit, holding means for maintaining said first valve spool at the second position of said first valve spool when said first valve spool moves to the second position of said first valve spool by said first shape memory alloy member and maintaining said second valve spool to the second position of said second valve spool when said second valve spool moves to the second position of said second valve spool by said second shape memory alloy member; and releasing means for releasing a state of said first and said second valve spools being maintained in the second positions thereof by said holding means when the third control current is supplied from said electronic control unit, whereby said first and said second valve spools can be moved to the first positions of said first and said second valve spools by said biasing means, wherein said biasing means has a first spring installed between a bottom surface of said compartment and a lower end of said first valve spool, and a second spring installed between said bottom surface of said compartment and a lower end of said second valve spool, said first and said second shape memory alloy members are respectively installed between said first valve spool and the bottom surface of said compartment and between said second valve spool and the bottom surface of said compartment, and are electrically connected to said electronic control unit, said first and said second shape memory alloy members each have a shape of a linear wire, and said first and said second shape memory alloy members have a total contraction and relaxation time below 100 milliseconds and generate a maximum tension of 5 Kgf.

7. An anti-lock brake system according to claim 6, wherein said holding means comprises:

a shaft transversely-installed within said compartment;

a plate pivotally-mounted about said shaft;

a plate spring installed between an inner sidewall of said compartment and a lower surface of said plate for elastically supporting said plate; and first and second ratchets formed to respective lower ends, said first and second ratchets being locked to said plate when said first and said second valve spools are positioned at the respective second positions.

8. An anti-lock brake system according to claim 7, wherein said releasing means comprises:

a release spool installed within said housing, to move upwards and downwards;

a release bias spring installed between said release spool and the bottom surface of said compartment for applying an upward biasing force to said release spool; and a release shape memory alloy member for lowering said release spool while overcoming the upward biasing force of said release bias spring when the second control current is supplied from said electronic control unit, whereby said release spool pivots said plate while being lowered so that said first and said second valve spools are moved to respective first positions by said biasing means.

9. An anti-lock brake system according to claim 8, wherein said release shape memory alloy member has a total contraction and relaxation time below 100 milliseconds and generates a maximum tension of 5 Kgf.

10. An anti-lock brake system comprising:

a master cylinder for generating a hydraulic pressure to a wheel brake attached to a wheel of a vehicle;

a hydraulic regulator having a hydraulic pump for regulating the hydraulic pressure of said master cylinder, and a hydraulic motor for driving said hydraulic pump;

an accumulator linked to said hydraulic pump for storing brake oil;

a wheel-speed sensor attached to said wheel for sensing a wheel speed to generate a wheel-speed signal;

a vehicle speed sensor for sensing a vehicle speed to generate a vehicle-speed signal;

an electronic control unit for receiving the vehicle-speed signal and the wheel-speed signal, and calculating a difference between the vehicle-speed signal and the wheel-speed signal to generate a first control current, a second control current, and a third control current; and a valve including a housing having a first bore and a second bore in the upper portion thereof and a compartment in a lower portion thereof, the first bore with a first inlet for introducing the brake oil from said master cylinder and a first outlet for discharging the brake oil to said wheel brake, the second bore with s second inlet communicated with the first bore and a second outlet for discharging the brake oil received from the second inlet to said hydraulic pump, a first valve spool and a second valve spool respectively having first and second ratchets formed to respective lower ends, said first valve spool closing said first inlet at a first position of said first valve spool and opening the first inlet at a second position of said first valve spool, said second valve spool closing the second outlet at a first position of said second valve spool and opening the second outlet at a second position of said second valve spool, a first spring installed between a bottom surface of said compartment and a lower end of said first valve spool for applying a biasing force to maintain said first valve spool at the first position of said first valve spool, and a second spring installed between a bottom surface of said compartment and a lower end of said second valve spool for applying a biasing force to maintain said second valve spool at the first position of said second valve spool, a first shape memory alloy wire installed between said first valve spool and the bottom surface of said compartment and electrically-connected to said electronic control unit for moving said first valve spool to the second position of said first valve spool while overcoming the biasing force of said first spring when the first control current is supplied from said electronic control unit, a second shape memory alloy wire installed between said second valve spool and the bottom surface of said compartment and electrically-connected to said electronic control unit for moving said second valve spool to the second position of said second first valve spool while overcoming the biasing force of said second spring when said second control current is supplied from said electronic control unit.

a holding unit having a shaft transversely-installed within said compartment, a plate pivotally-mounted about said shaft and a plate spring installed between an inner sidewall of said compartment and a lower surface of said plate for elastically supporting said plate, said first and second ratchets being locked to said plate when said first and second valve spools are placed on respective second positions; and a release part including a release spool being upwards and downwards movable within said housing, a release bias spring installed between said release spool and the bottom surface of said compartment for applying an upward biasing force to said release spool, and a release shape memory alloy wire for lowering said release spool while overcoming the upward biasing force of the release bias spring when the third control current is supplied from said electronic control unit, whereby said release spool pivots said place while lowering for moving said first valve spool to the first position of said first valve spool by means of said first spring, and moving said second valve spool to the first position of said second valve spool by means of said second spring.

* * * * *